(12) United States Patent
Christensen et al.

(10) Patent No.: US 12,204,597 B2
(45) Date of Patent: Jan. 21, 2025

(54) LOOK SELECTION BASED ON RELATIONSHIPS IN A VIRTUAL ENVIRONMENT

(71) Applicant: Micron Technology, Inc., Boise, ID (US)

(72) Inventors: Carla L. Christensen, Garden Valley, ID (US); Venkata Kiran Kumar Matturi, Milpitas, CA (US); Tara Gordon, San Francisco, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/237,702

(22) Filed: Aug. 24, 2023

(65) Prior Publication Data

US 2024/0070212 A1     Feb. 29, 2024

Related U.S. Application Data

(60) Provisional application No. 63/402,420, filed on Aug. 30, 2022.

(51) Int. Cl.
| | |
|---|---|
| *G06F 16/9535* | (2019.01) |
| *G06F 16/9536* | (2019.01) |
| *G06F 16/9538* | (2019.01) |
| *G06N 3/063* | (2023.01) |
| *G06N 3/08* | (2023.01) |

(52) U.S. Cl.
CPC ...... *G06F 16/9535* (2019.01); *G06F 16/9536* (2019.01); *G06F 16/9538* (2019.01); *G06N 3/063* (2013.01); *G06N 3/08* (2013.01)

(58) Field of Classification Search
CPC ............. G06F 16/9538; G06F 16/9536; G06F 16/9535; G06N 3/08; G06N 3/063
See application file for complete search history.

(56) References Cited

U.S. PATENT DOCUMENTS

| | | | |
|---|---|---|---|
| 8,019,654 B2 | 9/2011 | Alivandi | |
| 8,726,194 B2 | 5/2014 | Hildreth | |
| 2012/0079046 A1* | 3/2012 | Murphy | G06Q 30/0241 709/206 |
| 2012/0110477 A1 | 5/2012 | Gaume | |
| 2018/0308149 A1* | 10/2018 | Guo | G06N 3/045 |
| 2020/0195602 A1* | 6/2020 | Knopp | G06F 16/9538 |
| 2020/0387692 A1* | 12/2020 | Stokman | G06V 40/10 |
| 2021/0158415 A1* | 5/2021 | Hubbard | G06Q 30/0643 |
| 2022/0312052 A1* | 9/2022 | Aristarkhov | H04N 21/44008 |
| 2022/0374137 A1* | 11/2022 | Triverio | G06F 3/04845 |
| 2024/0062328 A1* | 2/2024 | Kwatra | G06N 3/006 |

* cited by examiner

*Primary Examiner* — Etienne P Leroux
(74) *Attorney, Agent, or Firm* — Brooks, Cameron & Huebsch, PLLC

(57) ABSTRACT

A processor of a host can define a plurality of relationships in a virtual environment. The processor of the host can also provide the plurality of inputs describing look preferences to an AI accelerator. The AI accelerator can receive the inputs. The AI accelerator can also generate a plurality of looks based on the plurality of relationships and the plurality of inputs.

21 Claims, 6 Drawing Sheets

LOOK SELECTION BASED ON RELATIONSHIPS IN A VIRTUAL ENVIRONMENT

PRIORITY INFORMATION

This application claims the benefit of U.S. Provisional Application No. 63/402,420 filed on Aug. 30, 2022, the contents of which are incorporated herein by reference.

TECHNICAL FIELD

Embodiments of the disclosure relate generally to look selection, and more specifically, relate to selecting a look based on a relationship in a virtual environment.

BACKGROUND

A memory sub-system can include one or more memory devices that store data. The memory devices can be, for example, non-volatile memory devices and volatile memory devices. In general, a host system can utilize a memory sub-system to store data corresponding to a virtual environment.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
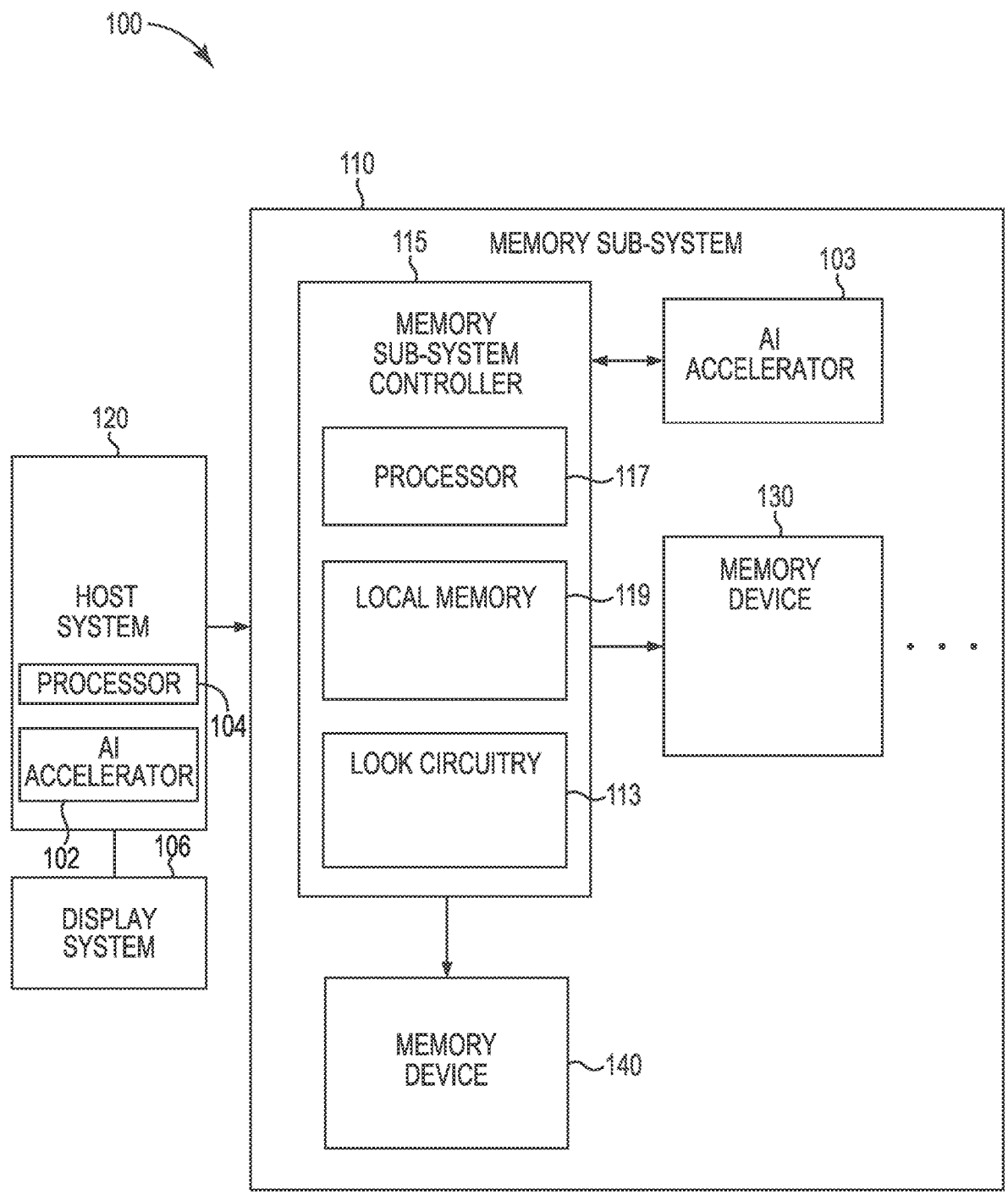
FIG. 1 illustrates an example computing system that includes a host system and a memory sub-system in accordance with some embodiments of the present disclosure.

Aspects of the present disclosure are directed to selecting a look, in particular to selecting a look based on a relationship in a virtual environment. In general, a host system can utilize a memory sub-system that includes one or more components, such as memory devices that store data. The memory devices can store image data that can be utilized in a virtual environment. The host system can provide the image data to be stored at the memory sub-system and can request the image data to be retrieved from the memory sub-system.

A virtual environment can include virtual reality and/or augmented reality, for example. The virtual environment can be an augmented reality environment and/or a metaverse. The metaverse can be implemented using virtual reality and/or augmented reality. The metaverse is a virtual environment in which users can interact with a computer-generated environment and other users. Users in the metaverse can utilize an avatar to interact with avatars of other uses and/or the virtual environment. The avatar can have a graphical representation which can interact with the computer-generated environment.

In previous approaches, the graphical representation of an avatar can be displayed to multiple different users participating in the metaverse. However, displaying a same avatar to multiple different users can be counterproductive to the interactions between a first user having the avatar and a second user who views the avatar or a third user who also views the avatar. For example, the first user can have a business relationship with a second user. The first user can have a friend relationship with a third user. An avatar displayed to a third users may be inappropriate if displayed to the second user and vice versa.

Aspects of the present disclosure address the above and other deficiencies by selecting different styles to display in a virtual environment. For example, an avatar can be modified based on a first style to generate a first modified avatar. The avatar can also be modified based on a second style to generate a second modified avatar. The first modified avatar can be displayed to the second user and the second modified avatar can be displayed to a third user. The first style and the second style can be selected based on a relationship between the first user and the second user and a relationship between the first user and the third user, respectively. In various instances, the styles used to modify an avatar can be generated utilizing an AI accelerator.

As used herein, AI refers to the ability to improve style selection through "learning" such as by storing patterns and/or examples which can be utilized to take actions at a later time. The patterns and/or examples stored and utilized can include patterns that are used to generate and/or provide styles for selection. Machine learning refers to a device's ability to learn from data provided as examples. Machine learning can be a subset of AI. AI can be implemented as an artificial neural network (ANN). As used herein, an ANN can provide learning by forming probability weight associations between an input and an output. The probability weight associations can be provided by a plurality of nodes that comprise the ANN. The nodes together with weights, biases, and activation functions can be used to generate an output of the ANN based on the input to the ANN. An ANN can utilize a number of inputs to generate styles that can be utilized to modify image data corresponding to an avatar.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. In various examples, the computing system 100 can be a headset (e.g., virtual reality headset).

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset (e.g., processor) 104 and a software stack executed by the processor chipset. The processor chipset 104 can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single-level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

The host system 120 can include the processor 104 and an AI accelerator 102. Although not shown in FIG. 1 so as to not obfuscate the drawings, the processor 104 and the AI accelerator 102 can include various circuitry to facilitate generating a plurality of looks for a virtual environment. The processor 104 can be used to participate in a virtual environment. For example, the processor 104 can generate image data which can be used to display a virtual environment (e.g., metaverse) to a user. In various instances, the processor 104 can provide image data to a different computing system 100 for display to a different user.

The image data can correspond to a profile of a user. The profile can comprise user data. For example, the profile can comprise a username, a user password, and/or an avatar, among other types of user data. As used herein, an avatar is a graphical representation of a user profile. The avatar can comprise the image data which can be used to display the avatar. The profile including the user data and the avatar including the image data can be stored in the memory sub-system 110.

The image data can be modified based on relationships between users. For example, a first user having a first profile can have a relationship with a second user having a second profile. The relationship can be a business relationship, a family relationship, and/or a friend relationship, among other types of relationships. The business relationship can further be defined as a work business relationship or a networking business relationship, among other types of business relationships. The family relationship can further be defined as a close family relationship and distant family relationship. Parents, grandparents, siblings, children, and/or grandchildren can be considered close family relationships. Cousins, uncles, aunts, nephews, and/or nieces can be considered distant family relationships. Friend relationships can further be divided into close friend relationships and distant friend relationships.

The image data of an avatar of a profile can be modified to add a look to the avatar displayed using the image data. The look can be relationship appropriate. For example, a look used for a business relationship can comprise formal attire while a look used for a family relationship can comprise informal attire. The processing resource 104 can modify the image data to include a look prior to providing the image data to different computing system for display.

In various instances, a look can describe characteristics of an avatar. For example, the look can comprise an outfit of the avatar, a hair style of the avatar, and/or a makeup style of the avatar, among other characteristics of the avatar. In various instances, a look can also comprise a hair color, a facial expression, and/or facial structural characteristics of the avatar. For instance, a look can comprise an eye shape and/or a face shape of the avatar, among other facial structural characteristics of the avatar. An outfit can include shoes, socks, pants, dresses, undergarments, tops, gloves, and/or accessories, among other items that can be included in an outfit.

The look can be selected by the AI accelerator 102. For instance, a plurality of inputs can be provided to the AI accelerator 102. The AI accelerator 102 can utilize the inputs to generate a look or generate a plurality of looks. Generating a look can include selecting components of the look (e.g., outfit, hair style, makeup style etc.) and combine the component into a look. The plurality of looks can be presented to a user using the display system 106, for example. The AI accelerator 102 can generate a look for a relationship. The AI accelerator 102 can also generate a plurality of looks for a relationship. The AI accelerator 102 can also generate a look for a plurality of relationships or a plurality of looks for a plurality of relationships. For instance, the AI accelerator 102 can generate a plurality of looks for a friend relationship and the use can select one look to show to other users with whom the user has a friend relationship. The AI accelerator 102 can also generate a plurality of looks and the user can select a look, from the plurality of looks, for each of a plurality of relationships.

FIG. 1 shows the processor 104 and the AI accelerator 102 as being part of the host system 120. In various instances, the processor and the AI accelerator can be located in the memory sub-system 110. For instance, the look circuitry 113 and the AI accelerator 103 can be located in the memory sub-system 110. The processor 104 can provide a command to the memory sub-system 110 to cause the memory sub-system 110 to generate a look. The memory sub-system 110 via the processor 117 can cause the look circuitry 113 to generate a look or a plurality of looks. The look circuitry 113 can include hardware and/or firmware.

The look circuitry 113 can provide inputs provided by the host system 120 or stored in the memory devices 130, 140 to the AI accelerator 103. The AI accelerator 103 can provide the looks generated to the look circuitry 113. The look circuitry 113 can store the looks in the memory devices 130, 140 or can provide the looks to the host system 120. The AI accelerator 103 can function similarly to the AI accelerator 102. However, utilizing the AI accelerator 103 can be more efficient than utilizing the AI accelerator 102 because the inputs can be retrieved and utilized by the AI accelerator 103 without providing the inputs to the host system 120 via the interface coupling the host system 120 and the memory sub-system 110.

The AI accelerator 103 is shown as being implemented separate from the memory devices 130, 140. The AI accelerator 103 can also be implemented in the sensing circuitry of the memory devices 130, 140 or under the memory devices 130, 140.

As used herein, the AI accelerators 102, 103 can include hardware and/or firmware configured to implement AI. The AI accelerators 102, 103 can comprise various circuitry (e.g., hardware) such as one or more processing devices (e.g., microprocessors) such as a graphic processing unit (GPU), an application specific integrated circuit (ASIC), or a field-programmable gate array (FPGA), for example. The AI accelerators 102, 103 can perform low-precision arithmetic operations. The AI accelerator 103 can be implemented using phase-change memory, for example. The processors of the AI accelerator 103 can be memory cells of a memory array. The memory cells can be used to perform matrix multiplication, for example. The memory cells can be configured to perform operations by controlling the resistance of the memory cells. The memory cells can be used to perform operations in parallel. In various examples, the AI accelerators 102, 103 can implement processors that are separate from the memory cells of a memory array.

The AI accelerators 102, 103 can be a deep learning accelerator (DLA), for example. The AI accelerator 103 can be implemented on an edge of the memory sub-system 110. For example, the AI accelerator 103 can be implemented external to the memory devices 130, 140. The AI accelerator 103 can be coupled to an output path that couples the memory devices 130,140 to the I/O circuitry of the memory sub-system 110. The AI accelerators 102, 103 can comprise feedback circuitry, for example. The input to the AI accelerators 102, 103 can be provided as input to an ANN which is hosted by the AI accelerators 102, 103.

Figure 2:
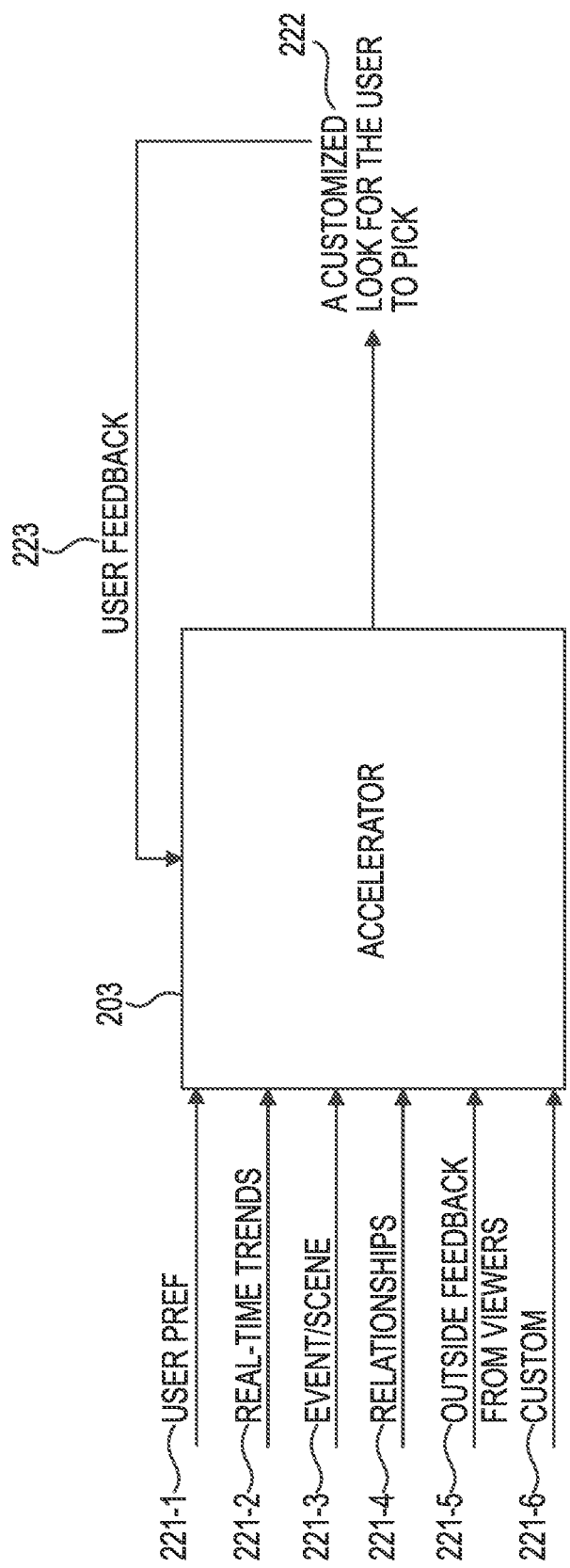
FIG. 2 illustrates a block diagram of an example AI accelerator in accordance with some embodiments of the present disclosure.

FIG. 2 illustrates a block diagram of an example AI accelerator 203 in accordance with some embodiments of the present disclosure. The AI accelerator 203 can be located in a host and/or in a memory sub-system. In various instances, the AI accelerator 203 can receive a user preference input 221-1, a real-time trends input 221-2, an event/scene input 221-3 (e.g., event input 221-3), a relationships input 221-4, an outside feedback input 221-5, and a custom input 221-6, referred to as inputs 221.

The AI accelerator 203 can generate an output 222 which can include a customized look for a user to select. Based on the selection, the feedback 223 (e.g., user feedback) can be generated and provided to the AI accelerator 203.

In various instances, the AI accelerator 203 can utilize hardware to generate the output 222. For example, the AI accelerator 203 can utilize a plurality of layers of hardware to perform convolution. The AI accelerator 203 can also utilize the hardware to implement an ANN.

The user preferences input 221-1 can describe the preferences that the user has expressed. For example, the user preferences input 221-1 can describe rules for outfits generated for each of the relationships. For example, the user preferences input 221-1 can define that shorts are not appropriate for formal outfits but are appropriate for casual outfits. User preferences can be gathered and/or generated from previous user feedback such as the feedback 223.

User preferences can be gathered from interactions between the user and different social media accounts. For example, a user having a user profile in a virtual environment can be associated with a different user profile associated with a social media platform. The different user profile can be monitored to identify posts that the different user profile has "liked" or "loved" among other feedback that can be provided through the social media platform. The feedback for the different user profile in the social media platform can be utilized as the user preference input 221-1. In various instances, the feedback from the different user profile(s) can be gathered by the processor 104 of FIG. 1. The feedback from the different user profile(s) can also be gathered by a centralized server (not shown) and provided to the host system 120 of FIG. 1. The feedback from the different user profiles(s) can be stored in the memory devices 130 and 140 of FIG. 1. The feedback from the different user profiles can be provided to the processor 104 to utilize as an input to the AI accelerator 203.

The real-time trend input 221-2 can describe trends for looks. For example, the real-time trend input 221-2 can describe outfit trends, makeup trends, and/or hair trends among other types of trends. Real-time trends can be generated by a third-party. For example, the real-time trends can be generated by a magazine, by a newspaper, and/or by industry experts such that the real-time trends do not originate from the user or a different user with whom the user has a relationship. The real-time trends can originate from an event such as a fashion show. The looks, including outfits, can be identified from a fashion show taking place in a particular city or country. The host (e.g., host system) can receive the real-time trends and can store the real time trends in the memory sub-system prior to providing the real-time trends to the AI accelerator 203. In various instances, the real-time trends can be provided to multiple computing systems associated with different users. For example, the real-time trends can be provided to a first computing system to allow a first user to select a look for relationships and a second computing system to allow second user to select a look for different relationships. The real-time trends can be made available to multiple users concurrently. As used herein, concurrence (e.g., concurrently) describes the occurrence of events at a same time or at relatively the same time.

The event input 221-3 can describe an event in which the user and a different user are participating. For instance, an event can be a sporting event, a business meeting, or a family gathering, among other types of events. The event can be a virtual event in which the user is participating and which may necessitate the display of an avatar of the user.

The relationships input 221-4 can describe one or more types of relationships for which the looks are generated. For example, the relationships input 221-4 can describe a family relationship type, a business relationship type, and/or a friend relationship type, among other types of relationships for which looks can be generated. The relationships input 221-4 can describe any combination of the relationship types. For instance, each bit of the relationship input 221-4 can represent a different type of relationship. If all the bits of the relationship input 221-4 are set, then the AI accelerator 203 can generate looks for all of the relationship types.

The outside feedback input 221-5 (e.g., outside feedback from viewers) can represent feedback provided by users (e.g., viewers) with which the user has a relationship or users with which the user does not have a relationship, but which have viewed an avatar of the user. As used herein, reference to users can also reference user profiles. For instance, reference to a user can also reference a user profile. "Outside" can also refer to feedback provided from outside the virtual environment. For instance, feedback provided, by friends of a user, to the user through a social media platform can be used as feedback for the virtual environment. If a second user provides feedback to a first user through a social media environment or any other type of environment, then the feedback can also be used for the virtual environment. The processor of the host can be configured to scan the social media platforms of the user to identify feedback and can provide said feedback to the AI accelerator 203.

The custom input 221-6 can describe a user selected input which can be utilized to generate looks. The custom input 221-6 can include, for example, inputs from other devices. The custom input 221-6 can include an input provided by a smart watch, a drone, a router, a microphone, and/or a camera, among other devices that can provide an input. In various instances, the custom input 221-6 can be a wardrobe from which outfits can be selected. The wardrobe can describe outfits the user owns or has access to from which outfits that contribute to a look can be selected.

The AI accelerator 203 can process the inputs 221 to generate the outputs 222 which include one or more looks. For example, the AI accelerator 203 can pad inputs which are not received. If no custom input 221-6 is received at the AI accelerator 203, then the AI accelerator 203 can pad the custom input 221-6 with 0's or 1's. The AI accelerator 203 can utilize the inputs 221 to generate looks. The user can select one of the looks or multiple of the looks.

The AI accelerator 203 can provide the output (e.g., looks) 222 to the host. The processor of the host can provide the looks to a user via a visual display (e.g., display system). The user can select a look or multiple looks and can indicate an association between the look or multiple looks and a user profile or multiple user profiles or a relationship type or multiple relationship types. For example, the user can select a look for a different user which whom the user has friend relationship (e.g., a friend relationship type). The user can also select a look for all user that have a particular relationship type such as a business relationship type such that the look is associated with a relationship type and not a particular user.

The user's selection can be utilized as the feedback 223 for the AI accelerator 203. For example, the host can receive the user's selection. The processor can use the selection to train a model utilized in the AI accelerator 203. For example, the processor can utilize the selection to train the weight and/or biases of an ANN of the AI accelerator 203.

Figure 3:
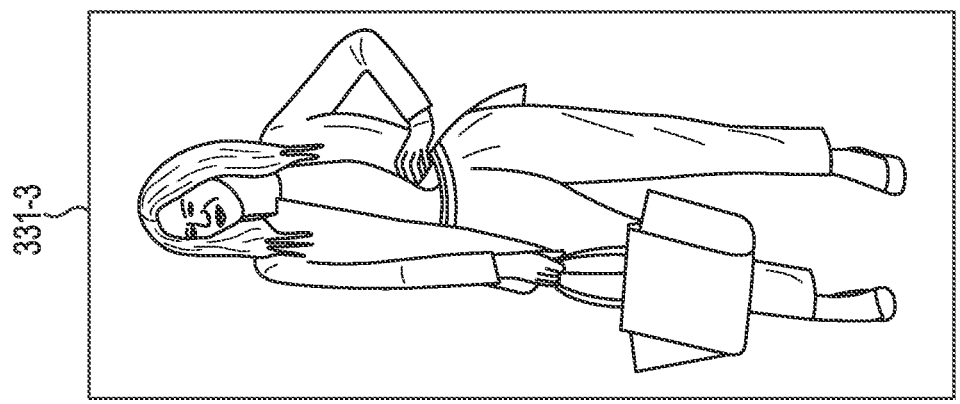
FIG. 3 illustrates looks in accordance with some embodiments of the present disclosure.
Figure 3:
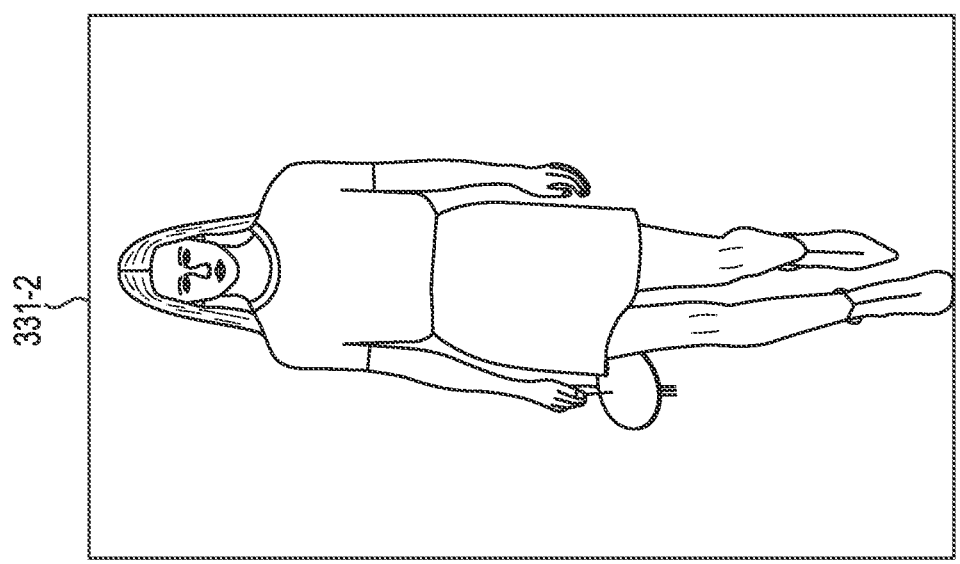
Figure 3:
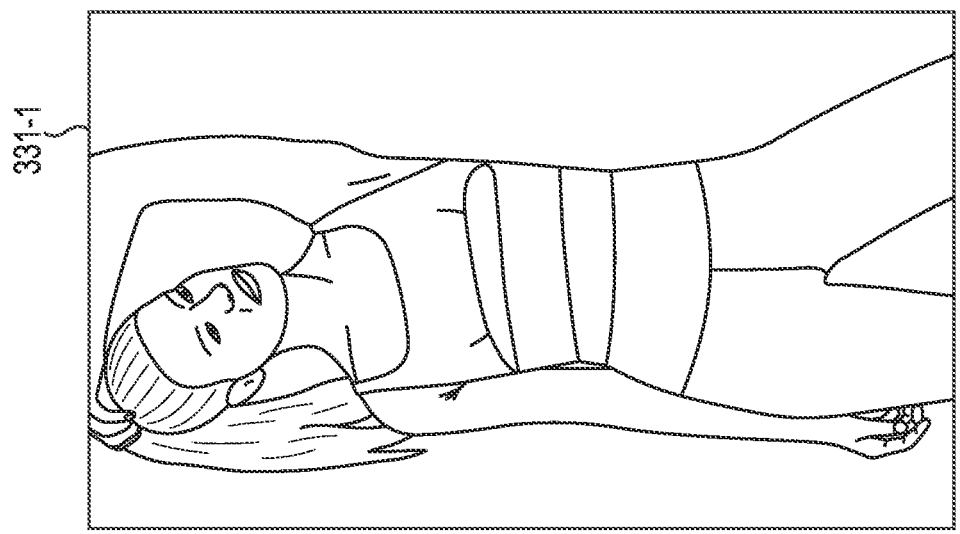

FIG. 3 illustrates looks 331-1, 331-2, 331-3 in accordance with some embodiments of the present disclosure. The looks 331-1, 331-2, 331-2 can be referred to as looks 331. The looks 331 are provided as visual example of data which can describe the look.

The looks 331 are examples of looks which can be generated by an AI accelerator. The look 331-1 represents an example of an athleisure style. The athleisure style can represent a combination of an athletic style and a leisure style. The athleisure style can describe clothing, makeup, and/or hair styles typically worn during athletic activities and in other casual or social settings. Athleisure outfits can include yoga pants, tights, sneakers, leggings, and/or shorts.

The look 331-2 represents an example of a designer fashion style. The designer fashion style comprises clothing that is fashionable or luxury clothing made by, or carrying the label of, a well-known fashion designer. The designer fashion style includes dresses, suits, pants, and skirts, and/or accessories like shoes and handbags.

The look 331-3 represents an example of business casual style. The business casual style describes clothing that is casual wear but that can be suitable for a work environment. The business casual style can include khaki pants, slacks, or skirts, short-sleeved polo shirts and long-sleeved shirts, and blazers or suit coats but excludes jeans, tight or short skits, and/or sweatshirts.

The examples provided for the looks 331 are not limiting but can be expanded to cover additional types of looks. The looks 331 show an array of looks for women but can include looks for men in the same styles and/or in other styles.

The looks 331 can be used to modify an avatar. For example, the avatar of each of the looks 331 can be a same avatar that has been modified to include specific outfits (e.g., clothing) and accessories. The avatar can be concurrently modified using the looks 331 such that three different sets of image data can be stored in memory and provided to different users in a virtual environment. The three different instances of the image data of the avatar can be provided concurrently to three different users (e.g., computer systems of the users) or at different times. Although image data is recited herein to identify how an avatar is presented, the image data can describe any representation of an avatar in a virtual environment. For example, the image data can be video data, three-dimensional (3D) data, augmented reality data, or any other representation of an avatar.

Figure 4:
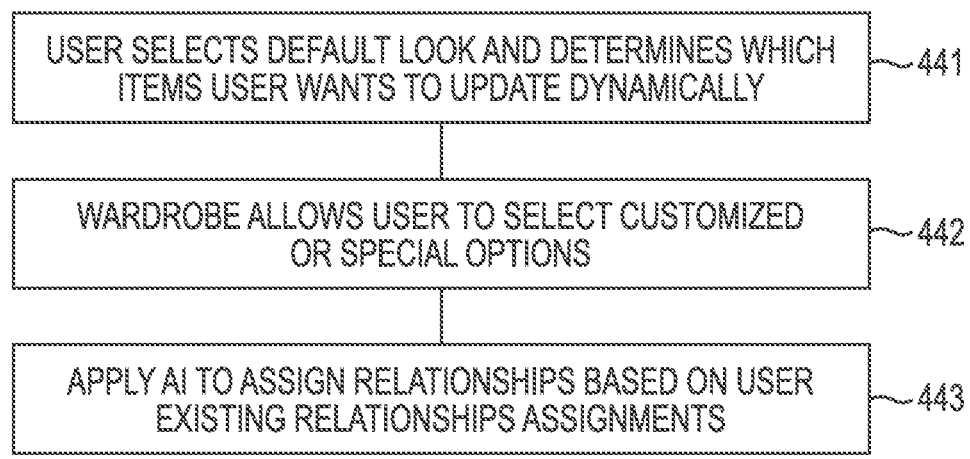
FIG. 4 is a flow diagram corresponding to a look selection in accordance with some embodiments of the present disclosure.

FIG. 4 is a flow diagram corresponding to a look selection in accordance with some embodiments of the present disclosure. The flow diagram can begin at 441. At 441, a user selects a default look and determines which items the user wants to update dynamically. The host can provide the user with options on what looks or parts of looks the user wants to update manually and/or dynamically. The user can identify that outfits are to be updated dynamically. The user can also identify that accessories are to be updated dynamically. The user can identify that hair styles are to be updated manually. The user can also select a default look. The default look can describe a look that is used to modify image data of an avatar in the absence of a different assigned look used to modify the image data of the avatar.

At 442, a wardrobe can allow a user to select customized or special options. For example, a wardrobe can describe outfits that a user owns or has access to. The user can also rent or purchase additional outfits. The user can purchase accessories and utilize outfits from a wardrobe. In various instances, an AI accelerator can provide options of looks that include items that need to be purchased or rented before they can be utilized as well as items from a wardrobe that the user already owns.

At 443, AI can be applied, via an AI accelerator, to assign relationships based on user existing relationship assignments. For example, the AI accelerator can provide looks that can be assigned to relationships having a particular type. The user can assign a particular look to a friend relationship type such that image data corresponding to avatars which are displayed to users which whom the user has a friend relationship is modified using the look. "Existing relationship assignments" can describe the assignment of a relationship type to a particular user which whom the user has a relationship. The look can be used to modify image data provided to users which whom the user has a friend relationship, for example.

Figure 5:
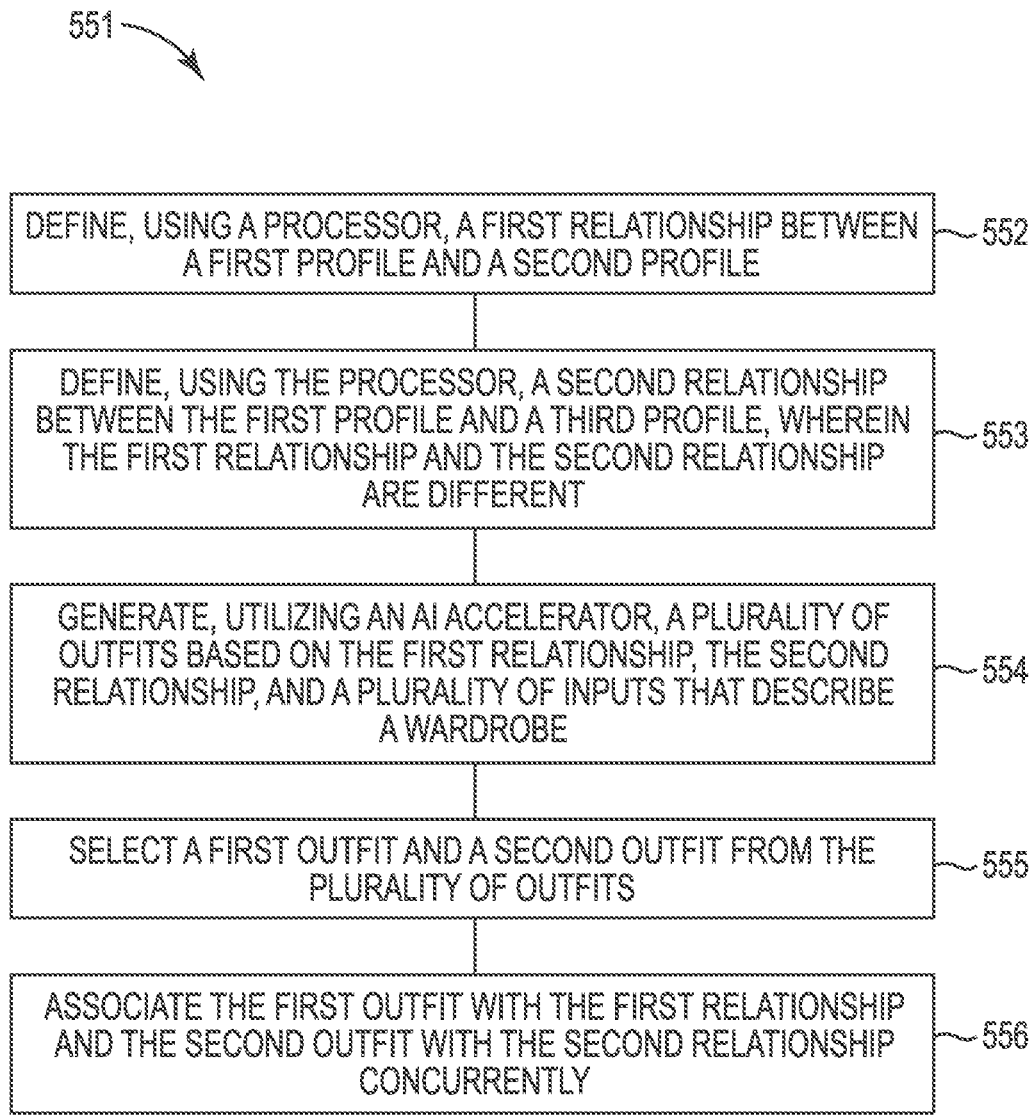
FIG. 5 is a flow diagram corresponding to a method for selecting a look in accordance with some embodiments of the present disclosure.

FIG. 5 is a flow diagram corresponding to a method 551 for selecting a look in accordance with some embodiments of the present disclosure. The method 551 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 551 is performed by the AI accelerator 102 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 552, a first relationship between a first profile and a second profile can be defined using a processor. The first profile can correspond to a first user of a virtual environment and the second profile can correspond to a second user of the virtual environment. Defining a relationship can include assigning a relationship type to the second profile or a link/association between the first profile and the second profile.

At 553, a second relationship between the first profile and a third profile can be defined using the processor. The first relationship and the second relationship can be different. For example, the first relationship can have a relationship type which is different than a relationship type of the second relationship. The first relationship type (e.g., the first relationship) can be a family relationship while the second relationship type (e.g., the second relationship) can be a business relationship.

At 554, a plurality of outfits can be generated, utilizing an AI accelerator, based on the first relationship, the second relationship, and a plurality of inputs that describe a wardrobe. For example, a data regarding a first plurality of outfits can be provided to the AI accelerator as an input. The AI accelerator can selection a second plurality of outfits from the first plurality of outfits based on the first relationship and the second relationship. The AI accelerator can select one or more outfits. One of the selected outfits can be assigned to the first relationship. The AI accelerator can also select a different one or more outfits. One of the selected outfits can be assigned to the second relationship.

At 555, a first outfit and a second outfit can be selected from the plurality of outfits. The user can select the first outfit and the second outfit. A host can utilize the selection to modify an avatar of the user. At 556, the first outfit can be associated with the first relationship and the second outfit can be associated with the second relationship, concurrently. Associating the first outfit with the first relationship and the second outfit with the second relationship concurrently allows for the first outfit and the second outfit to be used to modify an avatar concurrently. The avatar can be modified using the first outfit to generate a first modified avatar. The avatar can be modified using the second outfit to generate the second modified avatar. The first modified avatar and the second modified avatar can be displayed to different users concurrently.

In various examples, associating the first outfit with the first relationship and the second outfit with the second relationship can include providing an avatar, of the first profile having the first outfit, to a device associated with the second profile for display. Associating the first outfit with the first relationship and the second outfit with the second relationship can include providing the avatar, of the first profile having the second outfit, to a different device associated with the third profile for display, where the avatar is provided to the device and the different device concurrently.

In various instances, feedback can be received from the second profile and the third profile regarding the first outfit and the second outfit. The second profile can indicate that the first outfit is favorable while the third profile can indicate that the second outfit is not favorable. A host can update a model of the AI accelerator based on the feedback provided by the second profile and the third profile. The AI accelerator can then be used to generate a different plurality of outfits based on the updated model to provide different outfits for selection.

In various examples, a processor of a host can define a plurality of relationships between user profiles in a virtual environment and provide a plurality of inputs and the plurality of relationships to an AI accelerator. The plurality of relationships can be predefined such that the processor can access the plurality of relationships between a user and a plurality of users. For example, a user can manually assign relationship types to a plurality of users to define a relationship between the user and each of the plurality of users. An AI accelerator coupled to the processor can receive the plurality of inputs and can generate a plurality of looks based on the plurality of relationships and the plurality of inputs.

The AI accelerator can generate the plurality of looks by selecting an outfit and/or a hair style for each of the plurality of looks. The outfits can be selected from a wardrobe of outfits. The wardrobe of outfits can include outfits that are accessible to a user.

The plurality of relationships between the first profile and the plurality of profiles can be defined for a virtual environment. The virtual environment can be a metaverse, for example. The plurality of relationships between the first profile and the plurality of profiles can be defined for an augmented reality environment. An augmented reality environment is a real-world environment where the objects that reside in the real world are enhanced by computer generated objects. An association between a first profile and each of the plurality of profiles can be defined using a relationship type from the plurality of relationships.

The plurality of inputs can include feedback to visual data. The feedback can be provided by the first user or by the plurality of users. The processor can access the plurality of inputs, from a memory sub-system, prior to providing the inputs to the AI accelerator. The visual data can include the plurality of looks. For example, the visual data can include an avatar having one of the plurality of looks. The feedback can be provided by the plurality of profiles.

The inputs can also include event information corresponding to an event in which the profile and the plurality of profiles are participating. For example, the event can be a birthday party, a work meeting, or a worship event, among other types of events. The inputs can also include real-time trends. The real-time trends can refer to fashion trends that change over time and which can be utilized to select looks for relationships. The inputs can also include user preferences associated with the plurality of relationships. The user preferences can identify what types of styles and/or outfits can be utilized for what type of relationships. The user preference can also be expressed as negative limitations that describe types of styles and/or outfits that are not to be used with particular types of relationships. The processor can update the profile with image data of an avatar that comprises the plurality of looks. The plurality of looks, or at least the selected look, can be used to modify the image data to include the selected look.

A plurality of outfits can be generated at an AI accelerator based on the plurality of inputs defining a wardrobe. A user can select a first outfit, from the plurality of outfits, based on the first relationship. The user can also select a second outfit, from the plurality of outfits, based on the second relationship. The processor can modify first image data to include the first outfit. The processor can also modify second image data to include the second outfit. For example, the modified first image data can include an avatar in a first outfit while the modified second image data included the same avatar in the second outfit. The modified first image data can be separate from the modified second image data such that they are separate files stored in separate portion of a memory sub-system. The first image data can be provided to a first device associated with the second profile while the second image data is provided to a second device associated with the third profile.

The first image data and the second image data can be provided for display in an event in which the first profile, the second profile, and/or the third profile are participating. The second user of the second profile and the third user of the third profile can view different image data (e.g., first image data, second image data) even though the second profile and the third profile are participating in a same event. The first image data and the second image data can be displayed concurrently.

In various examples, the second profile and the third profile participate in different events. The first image data can be provided for display in an event in which the first profile and the second profile participate. The second image data can be provided for display in a different event in which the first profile and the third profile participate.

The first relationship and the second relationship can be defined based on social media profiles corresponding to the second profile and the third profile. For example, a second user of the second profile can also have a first social media profile. A third user of the third profile can also have a second social media profile. The first relationship and the second relationship can be defined based on the first social media profile and the second social media profile and their association to a third social media profile of the first user.

The first image data can be modified to incorporate the first outfit with an avatar of the first profile. The second image data can also be modified to incorporate the second outfit with the avatar of the first profile. In various examples, the inputs received at the AI accelerator can be outfits that are for sale or rent. The use may need to purchase the outfits that are for sale or for rent prior to being able to utilize the outfits to modify an avatar (e.g., image data).

Figure 6:
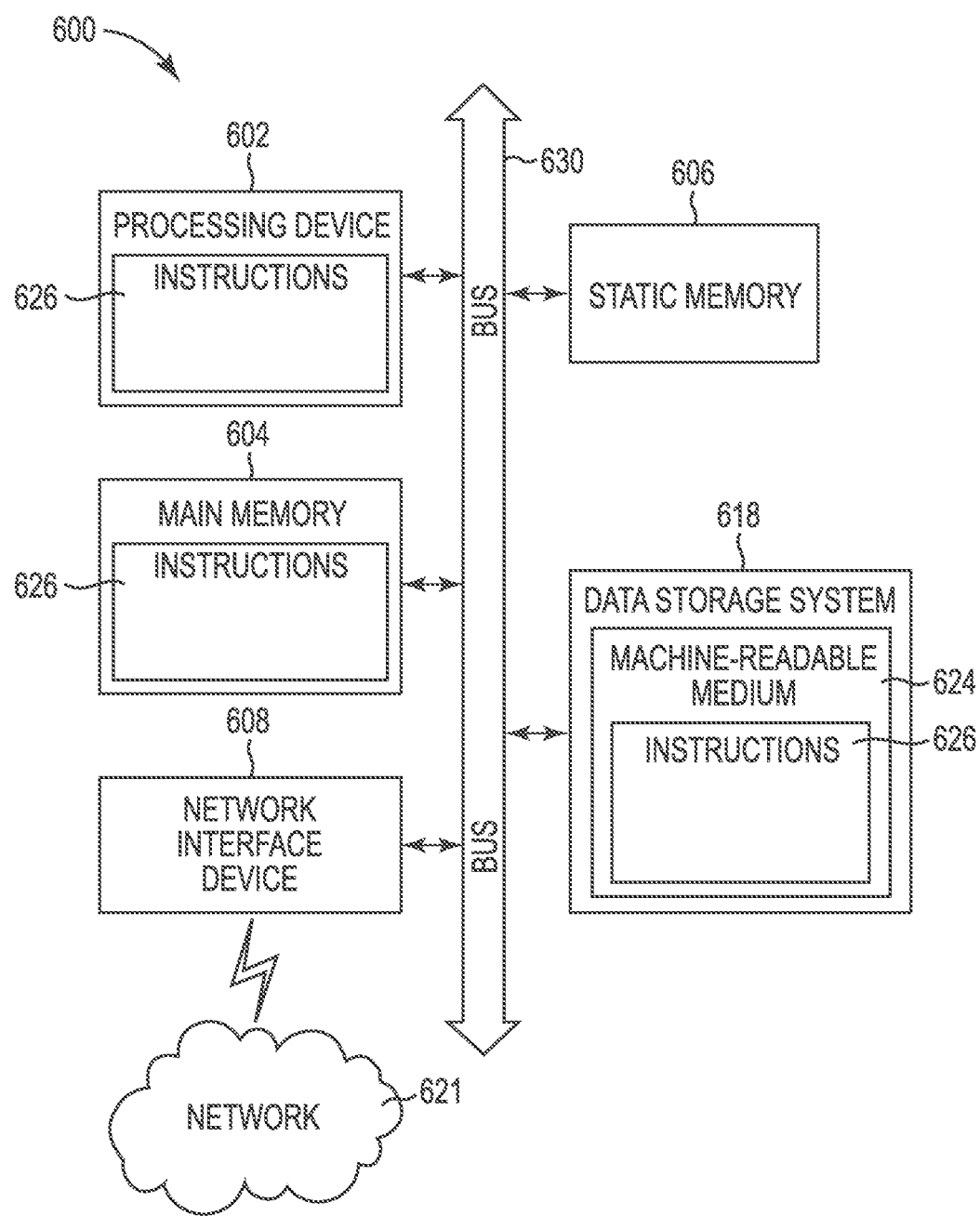
FIG. 6 is a block diagram of an example computer system in which embodiments of the present disclosure may operate.

FIG. 6 is a block diagram of an example computer system 600 in which embodiments of the present disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1). The computer system 600 can be used to perform the operations described herein (e.g., to perform operations corresponding to the processor 104 and/or the AI accelerator 102 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device (e.g., processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to selecting looks based on relationship for a virtual environment (e.g., processor 104 and/or AI accelerator 102 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus comprising:
   a processor configured to:
      define a plurality of relationships between user profiles in a virtual environment; and
      provide a plurality of inputs describing look preferences; and
   an artificial intelligence (AI) accelerator coupled to the processor and configured to:
      receive the plurality of inputs; and
      generate a plurality of looks based on the plurality of relationships and the plurality of inputs; and
   wherein the processor is further configured to:
      provide an avatar of a first profile of the user profiles, having a first look, to a device associated with a second profile of the user profiles for display; and
      provide the avatar of the first profile, having a second look, to a different device associated with a third profile of the user profiles for display, wherein the avatar is provided to the device and the different device concurrently.

2. The apparatus of claim 1, wherein generating the plurality of looks includes selecting an outfit and a hair style for each of the plurality of looks.

3. The apparatus of claim 1, wherein the processor is further configured to define the plurality of relationships between the first profile and a plurality of profiles of the virtual environment.

4. The apparatus of claim 1, wherein the virtual environment is an augmented reality environment and the processor is further configured to define the plurality of relationships between the first profile and a plurality of profiles of the augmented reality environment.

5. The apparatus of claim 1, wherein the plurality of inputs include feedback to visual data.

6. The apparatus of claim 5, wherein the visual data includes the plurality of looks.

7. The apparatus of claim 5, wherein the AI accelerator is configured to receive the feedback generated by a plurality of profiles.

8. The apparatus of claim 1, wherein the plurality of inputs includes event information corresponding to an event in which a first profile and a plurality of profiles are participating.

9. The apparatus of claim 1, wherein the plurality of inputs includes real-time trends.

10. The apparatus of claim 1, wherein the plurality of inputs includes user preference associated with the plurality of relationships.

11. The apparatus of claim 1, wherein the processor is further configured to update the first profile with image data comprising the plurality of looks.

12. A method comprising:
   defining, using a processor, a first relationship between a first profile and a second profile;
   defining, using the processor, a second relationship between the first profile and a third profile, wherein the first relationship and the second relationship are different;
   generating, utilizing an AI accelerator, a plurality of outfits based on the first relationship, the second relationship, and a plurality of inputs that describe a wardrobe;
   selecting a first outfit and a second outfit from the plurality of outfits; and associating the first outfit with the first relationship and the second outfit with the second relationship concurrently by:
  providing an avatar of the first profile, having the first outfit, to a device associated with the second profile for display; and
  providing the avatar of the first profile, having the second outfit, to a different device associated with the third profile for display, wherein the avatar is provided to the device and the different device concurrently.

13. The method of claim 12, further comprising receiving feedback from the second profile and the third profile regarding the first outfit and the second outfit.

14. The method of claim 13, further comprising:
  updating a model of the AI accelerator based on the feedback; and
  generating a different plurality of outfits based on the updated model to provide different outfits for selection.

15. A non-transitory machine-readable medium having computer-readable instructions, which when executed by a computer, cause the computer to:
  define, at a processor, a first relationship between a first profile and a second profile;
  define, at the processor, a second relationship between the first profile and a third profile wherein the first relationship is different than the second relationship;
  generate, at an artificial intelligence (AI) accelerator, a plurality of outfits based on the plurality of inputs defining a wardrobe;
  select a first outfit, from the plurality of outfits, based on the first relationship and a second outfit, from the plurality of outfits, based on the second relationship;
  modify, at the processor, first image data to include the first outfit;
  modify, at the processor, second image data to include the second outfit;
  provide the first image data to a first device associated with the second profiled; and
  provide a second image data to second device associated with the third profile.

16. The machine-readable medium of claim 15, wherein the computer-readable instructions are further configured to cause the computer to provide the first image data and the second image data for display in an event in which the first profile, the second profile, and the third profile are participating.

17. The machine-readable medium of claim 15, wherein the computer-readable instructions are further configured to cause the computer to:
  provide the first image data for display in an event in which the first profile and the second profile are participating; and
  provide the second image data for display in a different even in which the first profile and the third profile are participating.

18. The machine-readable medium of claim 15, wherein the computer-readable instructions are further configured to cause the computer to define the first relationship and the second relationship based social media profiles of the second profile and the third profile.

19. The machine-readable medium of claim 15, wherein the computer-readable instructions are further configured to cause the computer to modify the first image data to incorporate the first outfit with an avatar of the first profile and to modify the second image data to incorporate the second outfit with the avatar of the first profile.

20. The machine-readable medium of claim 15, wherein the computer-readable instructions are further configured to cause the computer to receive the plurality of inputs including outfits for sale.

21. The machine-readable medium of claim 15, wherein the computer-readable instructions are further configured to cause the computer to provide the first image data and the second image for displaying in a virtual environment in which the first profile, the second profile, and the third profile are participating.

* * * * *